(12) United States Patent
Jin

(10) Patent No.: US 12,054,360 B2
(45) Date of Patent: Aug. 6, 2024

(54) BULK LIFTING TRANSPORTATION SYSTEM APPLIED IN BUILDINGS

(71) Applicant: Shengxi Jin, Jilin (CN)

(72) Inventor: Shengxi Jin, Jilin (CN)

( * ) Notice: Subject to any disclaimer, the term of this patent is extended or adjusted under 35 U.S.C. 154(b) by 375 days.

(21) Appl. No.: 17/527,184

(22) Filed: Nov. 16, 2021

(65) Prior Publication Data
US 2022/0388813 A1    Dec. 8, 2022

(30) Foreign Application Priority Data

Jun. 7, 2021    (CN) .......................... 202110629582.X

(51) Int. Cl.
    *B66B 9/10*    (2006.01)
    *B66B 11/00*    (2006.01)
    *B66B 11/04*    (2006.01)

(52) U.S. Cl.
    CPC .............. *B66B 9/10* (2013.01); *B66B 11/006* (2013.01); *B66B 11/0407* (2013.01)

(58) Field of Classification Search
CPC ....... B66B 9/10; B66B 11/006; B66F 11/0095
See application file for complete search history.

(56) References Cited

U.S. PATENT DOCUMENTS 1,946,982 A * 2/1934 Mepeak .............. B66B 11/0213
    414/592

FOREIGN PATENT DOCUMENTS

GB          2169867    *  7/1986  ............... B66B 9/10

* cited by examiner

*Primary Examiner* — Mark C Hageman

(57) ABSTRACT

The present invention is a kind of bulk lifting transportation system applied in buildings, which relates to the elevator technology field and the construction field. It includes a lift shaft, and the lift shaft is provided with a driving mechanism, a reversing mechanism, and its transportation belt. The driving mechanism and the reversing mechanism are respectively arranged at the two ends of the lift shaft, and the conveyor belt bypasses the reversing mechanism and is connected with the driving mechanism; The conveyor belt is provided with loading devices for placing stuff at intervals. The number of loading devices is the same as the number of floors of the building, and the distance between adjacent loading devices is equal to the distance between adjacent pick-up openings; The process of connecting and separating greatly saves the time required for single lifting transportation and can significantly improve transportation efficiency.

5 Claims, 4 Drawing Sheets

BULK LIFTING TRANSPORTATION SYSTEM APPLIED IN BUILDINGS

TECHNICAL FIELD

The invention relates to the technical field of elevators and the field of construction, and in particular to a bulk lifting transportation system applied to buildings.

BACKGROUND

Nowadays, there are more and more high-rise buildings. In every tall building, there are one, several, or even dozens of elevators, which are responsible for the transportation of personnel and materials. Therefore, Elevators are an indispensable supporting facility in modern buildings. On the one hand, a sufficient number of elevators is required to meet smooth transportation. On the other hand, as a public facility, elevators cannot directly obtain a return on investment. Too many elevators will generate a larger share area and cannot meet the maximum use of the building area. Therefore, we often see that some buildings are crowded due to the insufficient number of elevators, and it is very difficult for residents to go up and downstairs.

With the development of society, the Internet is pushing the traditional retail industry to undergo a huge transformation, and the new retail business model covering all channels online and offline has developed tremendously. Due to the long waiting time for residents to go up and down, it is necessary to deliver goods or services to consumers' designated addresses. "Deliver to home" services are increasingly becoming a mainstream business model in response to consumer needs. However, the current "Deliver to home" delivery is point-to-point delivery, which relies heavily on couriers, and it is difficult to collectively deliver goods involved in many orders. The cost is also very high. In order to reduce the cost of distribution, unmanned distribution technology is being tested and promoted in the field of distribution. The residential characteristics of Chinese cities are high residential density and high floors. Therefore, the distribution must meet two points. One is the large delivery volume during the morning and evening peak hours, and the other is the ability to go upstairs. Climbing the stairs is exhausting, and blocking the stairs causes obstacles to the passage or evacuation of people. If the couriers take the elevator, it will take up the limited space of the elevator and cause inconvenience to the residents. It is very necessary for the building to be equipped with special small cargo elevators to realize the lifting of goods and the diversion of people and goods.

The application number is "202010938073.0" and the invention title is "a continuous lifting mechanism, an improvement of a continuous lifting mechanism with lift shaft". The invention patent discloses a lifting mechanism that can transport goods on multiple floors at the same time through a single lifting. Although it can improve delivery efficiency to a certain extent and reduce the labor of the delivery personnel, the loading device needs to be equipped with elevators at the top and bottom, resulting in a complicated structure of the loading device and the lifting process. The lifting process needs to be connected through the connecting device between the top and bottom of the loading device, resulting in a cumbersome lifting process and relatively low work efficiency; Moreover, it requires a larger space to store the load device at the bottom of the building, which occupies a larger space. To a certain extent, it will increase the construction cost of the building.

Therefore, it is an urgent technical problem in this field to further improve transportation efficiency while facilitating the transportation of goods.

SUMMARY OF THE INVENTION

The purpose of the present invention is to provide a bulk lifting transportation system used in buildings to solve the problems existing in the prior art. The process of transferring the load device from the storage room and its temporary connection/separation in the traditional lifting transportation device is omitted. It greatly saves the time required for single lifting transportation, and can significantly improve transportation efficiency.

In order to achieve the above objective, the present invention provides the following solutions: The present invention provides a bulk lifting transportation system applied to a building, which is characterized in that: a plurality of pick-up openings is evenly arranged on the sidewall of the lift shaft, and the pick-up openings are corresponding to each floor of the building.

The lift shaft is provided with a driving mechanism, a reversing mechanism, and a conveyor belt. The driving mechanism and the reversing mechanism are respectively arranged at both ends of the lift shaft. The conveying belt bypasses the reversing mechanism and connects with the driving mechanism; The conveyor belt is provided with loading devices for placing goods at intervals, the number of the loading devices is the same as the number of floors of the building, and the distance between the adjacent loading devices is equal to the distance between adjacent pick-up openings.

Preferably, a track is further provided in the lift shaft, and the track is arranged along the conveyor belt and located on both sides of the conveyor belt. The conveyor belt and the load device are connected by a connecting frame. The connecting frame includes a rotating lift shaft (axis for rotation). The conveyor belt and the load device are connected by a connecting frame. The connecting frame includes a rotating lift shaft. The two ends of the rotating lift shaft are provided with rollers. The two rollers are respectively arranged in the two rails and run along with the orbital movement.

Preferably, the bottom of the loading device is fixedly connected with two inclined support rods, and the ends of the inclined support rods are provided with support wheels. The support wheel abuts on the track; The bottom of the loading device is also provided with a pull rod, and the end of the pull rod is connected with the inclined support rod and is arranged close to the support wheel.

Preferably, the track has a concave-shaped structure. The roller abuts against the inner surface of the concave-shaped structure, and the support wheel abuts against the outer surface of the concave-shaped structure.

Preferably, the track is fixed on the inner wall of the lift shaft by a bracket.

Preferably, the driving mechanism includes the traction machine (elevator tractor) arranged on the top of the lift shaft. The transportation belt includes a chain, and the reversing mechanism includes a sprocket arranged at the bottom of the lift shaft; The traction machine is connected to the end of the chain through a steel cable, and the chain meshes with the sprocket.

Preferably, a micro warehouse for temporarily storing goods is further provided at the pickup opening. The front end and the rear end of the micro warehouse are respectively provided with a front opening and a rear opening. The rear opening is internally connected to the vertical lift shaft. The goods are carried into the micro warehouse by the carrier in the load device. When the front opening is on the correct floor, goods can be taken out through the front opening.

Preferably, the carrier (feeding device) includes a horizontally placed cargo pushing cylinder. The end of the piston rod of the cargo pushing cylinder is aligned with the rear opening (The piston rod picks up the goods). The loading device is also provided with a control module that controls the movement of the cargo pushing cylinder; After the conveyor belt is stopped, the control module controls the extension of the piston rod to deliver the goods into the micro warehouse.

Preferably, a front door is provided at the front opening, and an electronic lock is provided on the front door; The rear opening is provided with a rear door that can be opened inward. The rear door is hinged on the sidewall of the micro warehouse, and a reset pressure spring is arranged on the hinge lift shaft. Both the front door and the rear door are made of fireproof materials.

Preferably, the driving mechanism is a linear motor, and two ends of the conveyor belt are respectively connected to the linear motor for transmission.

COMPARED WITH THE PRIOR ART, THE PRESENT INVENTION HAS ACHIEVED THE FOLLOWING TECHNICAL EFFECTS

1. By setting up the reversing mechanism and its conveyor belt in the lift shaft, the present invention can fix all the load devices on the conveyer belt. There is no need to set up a separate storage room to store the loading device, which makes the system structure of the lifting transportation system simpler; After the loading device is all fixed on the conveyor belt, the transfer of the loading device from the storage room and the temporary lifting device in the traditional lifting and transportation device are omitted. The process of connecting and separating greatly saves the time required for single lifting transportation and can significantly improve transportation efficiency.

2. The present invention can deliver goods to all floors at the same time, avoiding delivery personnel occupying elevators. On the one hand, it can reduce the burden of elevators during peak hours, and on the other hand, it can reduce the labor intensity of couriers and improve delivery efficiency;

3. The driving mechanism in the present invention includes the traction machine (elevator tractor) arranged on the top of the lift shaft. Both ends of the steel cable on the traction machine are connected to the chain. Together with the reversing mechanism, a tensioning system can be formed, which is conducive to the smooth operation of the lifting system.

DESCRIPTION OF THE DRAWINGS

In order to explain the embodiments of the present invention or the technical solutions in the prior art more clearly, the following will briefly introduce the drawings needed in the embodiments. Obviously, the drawings in the following description are only some embodiments of the present invention. For those of ordinary skill in the art, other drawings can be obtained based on these drawings without creative labor.

Among them, 1. lift shaft; 2. Load device; 3. Chain; 4. Sprocket; 5. Connecting frame; 6. Roller; 7. Track; 8. inclined support rod; 9. support wheel; 10. pull rod; 11. micro warehouse.

DETAILED DESCRIPTION

The technical solutions in the examples of the present invention will be described clearly and completely. Obviously, the described examples are only a part of the embodiments of the present invention, rather than all the situations. Based on the embodiments of the present invention, all other embodiments obtained by those of ordinary skill in the art without creative work shall fall within the protection scope of the present invention.

The purpose of the present invention is to provide a bulk lifting transportation system used in buildings to solve the problems existing in the prior art. The process of transferring the load device from the storage room and its temporary connection/separation in the traditional lifting transportation device is omitted. It greatly saves the time required for single lifting transportation, and can significantly improve transportation efficiency.

In order to make the above objectives, features, and advantages of the present invention more obvious and understandable, the present invention will be further described in detail below regarding the accompanying drawings and specific examples.

Figure 1:
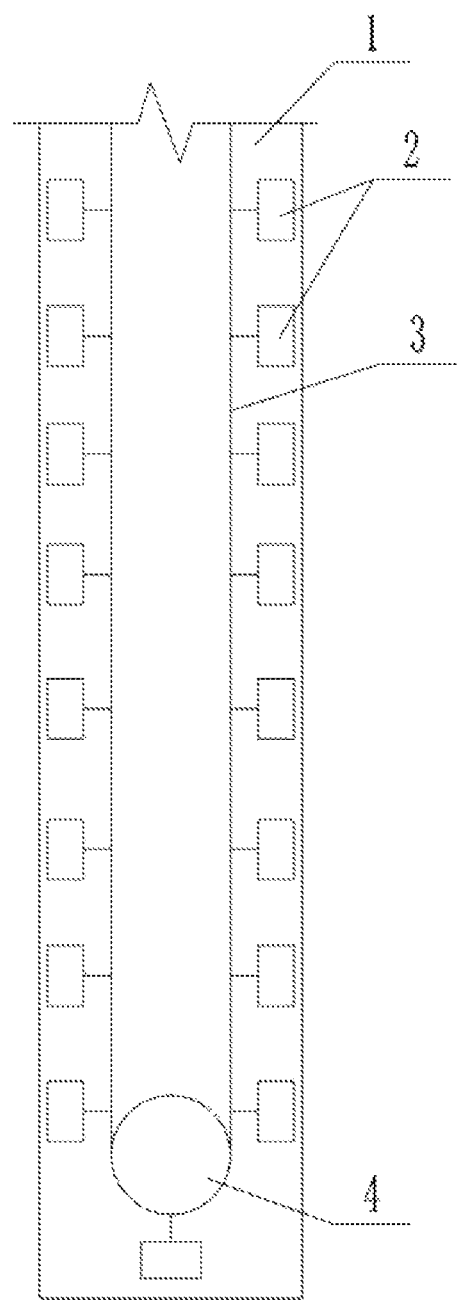
FIG. 1 is a schematic diagram of the distribution of the loading device of the present invention in the lift shaft.

As shown in FIG. 1, this embodiment provides a bulk lifting transportation system applied to buildings, including lift shaft 1. A number of pick-up openings are evenly arranged on the sidewall of lift shaft 1 from top to bottom, and each pick-up opening is respectively corresponding to each floor of the building; lift shaft 1 is provided with a driving mechanism, a reversing mechanism, and its transport belt. The driving mechanism and the reversing mechanism are respectively arranged at the two ends of lift shaft 1. Either the driving mechanism and the reversing mechanism can be installed on the top of lift shaft 1. The transport belt bypassing the reversing mechanism, both ends are connected with the driving mechanism; The conveyor belt is provided with loading device 2 for placing goods at intervals. The number of loading device 2 is the same as the number of floors of the building, and the distance between adjacent loading device 2 is equal to the distance between adjacent pick-up openings. Generally, it is the height of the floor.

Before the goods need to be transported, the loading device 2 corresponding to the highest floor is in the cargo area. Put the goods to be transported into the corresponding loading device 2 in the order from high to low. For example, if the building has a total of 33 floors, there are 33 load-carrying devices 2 correspondingly; Before the cargo is transported, the loading device 2 corresponds to the 33rd floor is located in the cargo delivery area. After the cargo is dropped, the driving mechanism drives the conveyor belt to move, so that the next cargo device 2 that needs to drop cargo moves to the cargo delivery area. And repeat this process. If there is no cargo to be transported on a certain floor or a few floors, skip the loading device 2 of the corresponding floor; When all the goods are put in, the driving mechanism drives the conveyor belt to move. When the topmost loading device 2 reaches the topmost layer, all loading device 2 arrive at the corresponding floor at the same time. Thus, it can be lifted at one time, and the goods on different floors can be delivered at the same time.

As another way of lifting transportation, when placing goods, this embodiment can also place the goods with the highest number of layers that need to be delivered in the top loading device 2. For example, if the building has a total of 33 floors, the goods that need to be transported reach only up to 22 floors. We can place 22 floor's goods in the topmost loading device 2. Then, Put the goods with a lower number of layers into the subsequent loading device 2. The difference in the number between the two loading device 2 is equal to the difference in the number of floors of the two cargo delivery floors. When all the goods are put in, the driving mechanism drives the conveyor belt to move. When the top loading device 2 reaches the 22nd floor, the other loading device 2 also reach the corresponding floor. Thus, it can also deliver goods from different floors at the same time through a single lift; Therefore, this embodiment can accomplish the delivery of goods to each floor. It prevents the delivery personnel from occupying the elevator, which can reduce the burden of the elevator during peak hours, and reduce the labor intensity of the express personnel and improve delivery efficiency.

Since lift shaft 1 disclosed in this embodiment is provided with a reversing mechanism, the conveyor belt can be wound around it for turning. After loading device 2 is fixed on the conveyor belt, the two sides of lift shaft 1 are divided into the transportation side and the temporary side according to their functions. When lifting transportation is not carried out, all the loading device 2 are on the temporary side. When lifting transportation is required, the driving mechanism drives the conveyor belt to move. Make the load device 2 move to the transport side one by one to receive the goods and perform lifting operations. After the transportation is completed, loading device 2 returns to the temporary side; Therefore, in this embodiment, by arranging the reversing mechanism and its transport belt in lift shaft 1, all loading device 2 can be fixed on the transport belt. There is no need to set up a separate storage room to store the load device 2, which makes the system structure of the lifting transportation system simpler; After loading device 2 is all fixed on the conveyor belt, the transfer of the loading device 2 from the storage room and the temporary lifting device in the traditional lifting and transportation device are omitted. The process of connecting and separating greatly saves the time required for single lifting transportation and can significantly improve transportation efficiency.

It should be noted that when loading device 2 is transferred from the transport side to the temporary side, it will flip under the reversing action of the reversing mechanism. Nonetheless, there are no movable parts inside loading device 2. So even if it occurs, turning over will not affect its normal use.

The goods targeted by this embodiment are generally small in volume and low in quality, such as express delivery, fruits and vegetables, food, and so on. The width and length of loading device 2 can be set according to the size of the actual lift shaft 1.

In this embodiment, a servo control system is also provided. The servo control system is electrically connected with the driving mechanism to control the lifting of the driving structure; Regarding the above two lifting methods, you can switch the mode of the servo control system or manually control; lift shaft 1 and the loading device 1 also need to be equipped with floor sensors, encoders and leveling sensors, which are used for distance measurement and leveling. Each sensor can be electrically connected to the servo control system. If it cannot be electrically connected, it can output a wireless signal for signal transmission. Those skilled in the art can choose by themselves; In addition, the setting of the control program in the servo control system, the connection between the servo control system, various sensors, and electrical components are well known to those skilled in the art. These will not be described in detail in this embodiment.

The driving mechanism in this embodiment includes the traction machine set on the top of lift shaft 1. The conveyor belt includes a chain 3. The carrying device 2 can be directly fixed on chain 3, and a connecting frame 5 or other mechanisms can be arranged on chain 3 to fix the carrying device 2; The reversing mechanism includes a sprocket 4 arranged at the bottom of lift shaft 1. After chain 3 bypasses the sprocket 4, the two ends are respectively fixed to the two ends of the steel cable on the traction machine. When lifting, one end of chain 3 rises, and the other end falls. Working together with the reversing mechanism can form a tensioning system, which contributes to the smooth operation of the lifting system; Of course, the driving mechanism can also be selected as the sprocket 4. The sprocket 4 can be provided with one or multiple vertically. The sprocket 4 drives chain 3 to circulate in lift shaft 1 (cyclic movement); And chain 3 can be provided with one or more.

The driving mechanism is not limited to the traction machine. It can also be a linear motor. Both ends of the conveyor belt are driven by two linear motors. When working, one linear motor drives the conveyor belt up while the other side linear motor drives the conveyor belt down. Vice versa.

Figure 2:
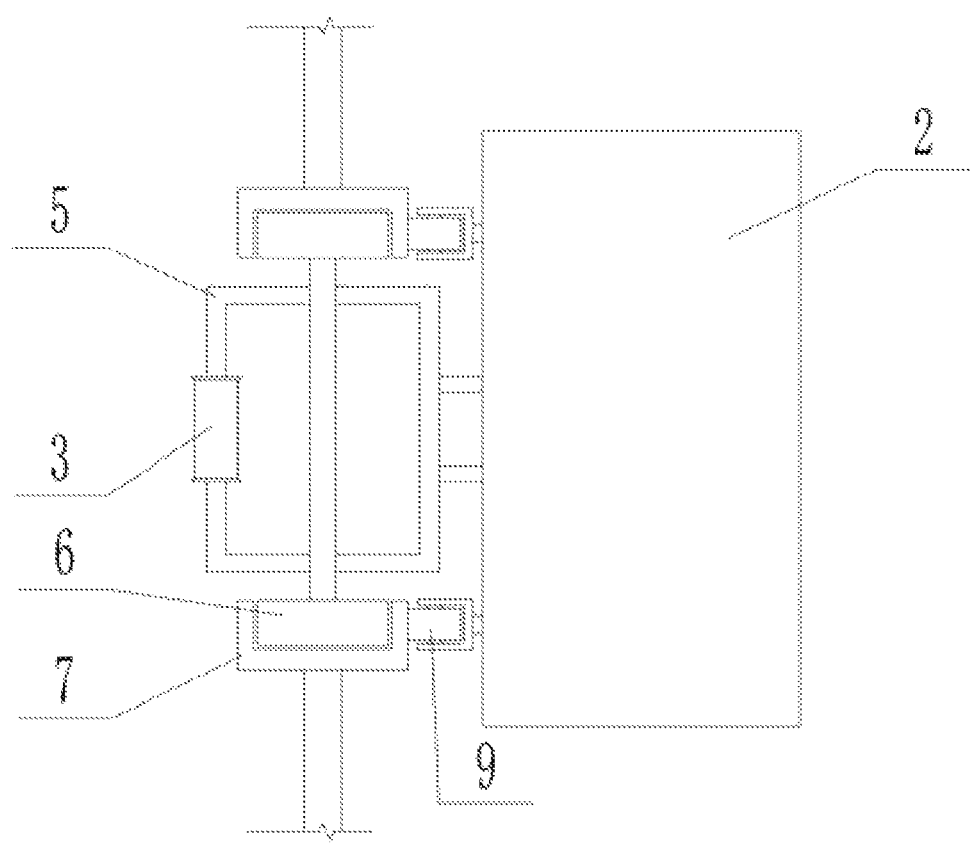
FIG. 2 is a top view of the assembly relationship between the load device and the chain.
Figure 3:
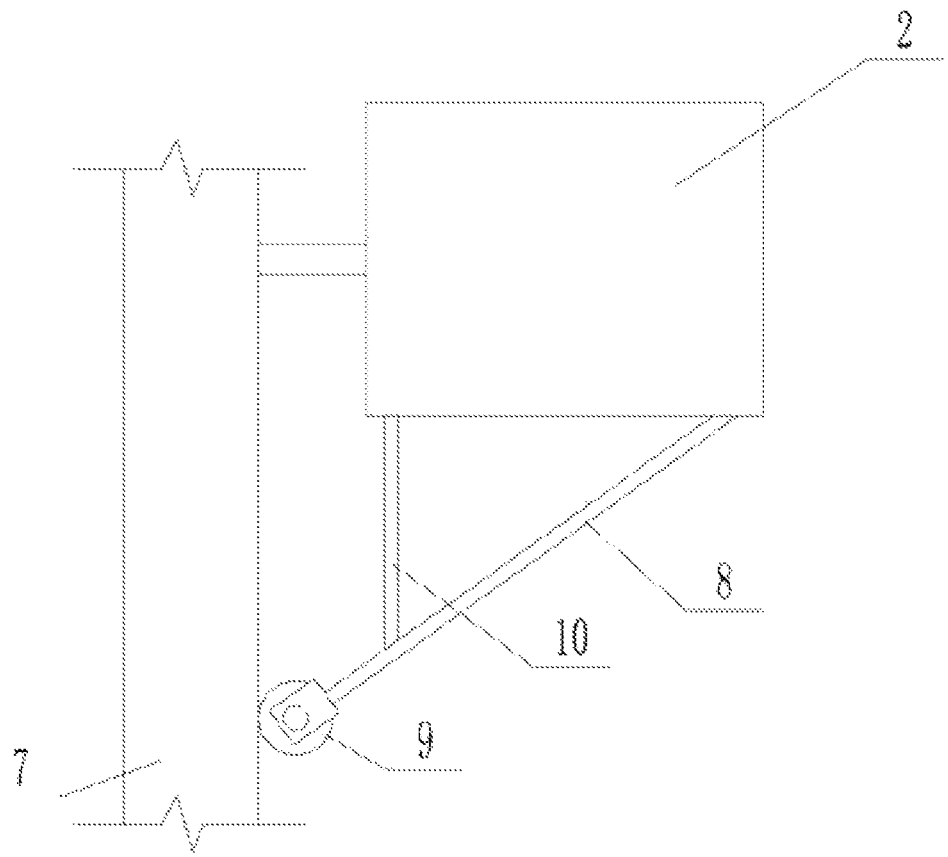
FIG. 3 is a front view of FIG. 2.

As shown in FIGS. 2 and 3, chain 3 and the load device 2 are connected by a connecting frame 5. The connecting frame 5 includes a rotating lift shaft. The two ends of the rotating lift shaft are provided with rollers 6, and lift shaft 1 is also provided with a track 7. Track 7 is fixed on the inner wall of lift shaft 1 by a bracket and is arranged along chain 3. It is located on both sides of chain 3. The two roller 6 are respectively arranged in the two track 7 and move along the track 7; Track 7 can improve transportation stability of chain 3 and prevent shaking when it goes higher.

In this embodiment, the bottom of the load device 2 is fixedly connected to two inclined support rods 8. The end of the inclined support rod 8 is provided with a support wheel 9, and the support wheel 9 abuts on track 7. Among them,track 7 has a concave-shaped structure. Roller 6 abuts against the inner surface of the concave-shaped structure, and the support wheel 9 abuts against the outer surface of the concave-shaped structure; The bottom of the load device 2 is also provided with a pull rod 10. The end of the pull rod 10 is connected to the inclined support rod 8 and is arranged close to the support wheel 9; The pull rod 10 and the inclined support rod 8 form a triangular support structure, which can make loading device 2 stronger.

Figure 4:
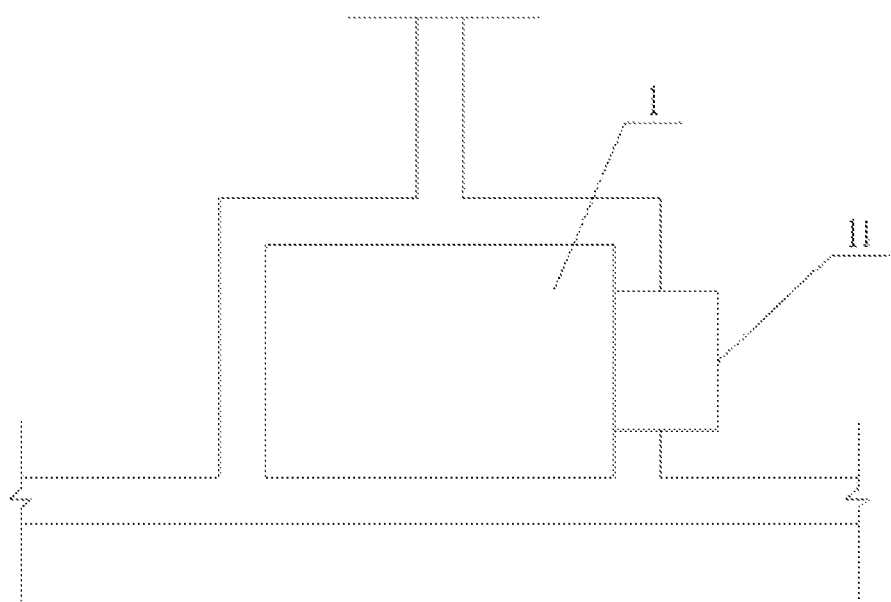
FIG. 4 is a schematic diagram of the structure of the micro warehouse in the lift shaft.

As shown in FIG. 4, in order to facilitate practical use, this embodiment is also provided with a micro warehouse 11 for temporarily storing goods at the pick-up opening of lift shaft 1. The front and rear ends of the micro warehouse 11 are respectively provided with a front opening and a rear opening. The rear opening is internally connected with lift shaft 1. Use the carrier (feeding device) in loading device 2 to send the goods into the micro warehouse 11. The front opening is located on the floor, and the goods can be taken out through the front opening; Specifically, the feeding device includes a horizontally placed cargo pushing cylinder. The end of the piston rod of the cargo pushing cylinder is directly opposite to the rear opening. The loading device 2 is also provided with a control module for controlling the movement of the cargo pushing cylinder; After loading device 2 is aligned with the micro warehouse 11, it will open. The control module controls the extension of the pickup piston rod to send the goods into the micro warehouse 11.

In this embodiment, the front opening of the micro warehouse 11 is provided with a front door, and the rear opening is provided with a rear door that can be opened inward. In order to meet building fire protection requirements and ensure cargo safety, both the front door and the rear door are made of fireproof materials.

In order to simplify the process for the cargo cylinder to push the cargo into the micro warehouse 11. The rear door is hinged with the sidewall of the micro warehouse 11, and a reset pressure spring is arranged on the hinge axis. After the cargo is pushed in by the cargo pushing cylinder, the rear door can be automatically reset. In order to ensure the safety of the goods, an electronic lock is installed on the front door.

All adaptive changes made according to actual needs fall within the protection scope of the present invention.

It should be noted that for those skilled in the art, it is obvious that the present invention is not limited to the details of the above exemplary embodiments. The present invention can be implemented in other specific forms without departing from the spirit or basic characteristics of the present invention. Therefore, from any point of view, the embodiments should be regarded as exemplary and non-limiting. The scope of the present invention is defined by the appended claims rather than the above description, and therefore it is intended to fall into the claims. All changes within the meaning and scope of the equivalent elements are included in the present invention. Any reference signs in the claims should not be regarded as limiting the claims involved.

The invention claimed is:

1. A bulk lifting transportation system applied to a building, comprising a lift shaft,
a plurality of pick-up openings is evenly arranged on the sidewall of the lift shaft, and the pick-up openings are corresponding to each floor of a building;
the lift shaft is provided with a driving mechanism, a reversing mechanism, and a conveyor belt; the driving mechanism and the reversing mechanism are respectively arranged at both ends of the lift shaft; the conveying belt bypasses the reversing mechanism and connects with the driving mechanism; the conveyor belt is provided with loading devices for placing goods at intervals, the number of the loading devices is the same as the number of the pick-up openings, and the distance between the adjacent loading devices is equal to the distance between adjacent pick-up openings;
the driving mechanism includes a first sprocket arranged on the top of the lift shaft; the conveyor belt includes a chain, and the reversing mechanism includes a second sprocket arranged at the bottom of the lift shaft; and the chain meshes with both of the first and second sprockets; and
a micro warehouse for temporarily storing goods is further provided at the pickup opening; the front end and the rear end of the micro warehouse are respectively provided with a front opening and a rear opening; the rear opening is internally connected to the vertical lift shaft; the goods are carried into the micro warehouse by a carrier in the load device; when the front opening is on the correct floor, goods can be taken out through the front opening.

2. The bulk lifting transportation system applied to a building according to claim 1, wherein two tracks are further provided in the lift shaft, and the tracks are arranged along the conveyor belt and located on both sides of the conveyor belt; the conveyor belt and the load device are connected by a connecting frame, the connecting frame includes a rotating lift shaft; two ends of the rotating lift shaft are provided with rollers; the two rollers are respectively arranged in the two tracks and run along with the tracks direction.

3. The bulk lifting transportation system applied to buildings according to claim 2, wherein the bottom of the loading device is fixedly connected with two inclined support rods, and the ends of the inclined support rods are provided with support wheels; the support wheel abuts on the track; the bottom of the loading device is also provided with a pull rod, and the end of the pull rod is connected with the inclined support rod.

4. The bulk lifting transportation system applied to buildings according to claim 3, wherein the track has a concave-shaped structure; the rollers abut against the inner surface of the concave-shaped structure, and the support wheels abut against the outer surface of the concave structure.

5. The bulk lifting transportation system applied to buildings according to claim 4, wherein the track is fixed on the inner wall of the lift shaft.

* * * * *